United States Patent [19]
Hake

[11] Patent Number: 5,163,040
[45] Date of Patent: Nov. 10, 1992

[54] RECORD LOAD-UNLOAD DEVICE

[75] Inventor: Martin Hake, Willingen-Schwenningen, Fed. Rep. of Germany

[73] Assignee: Deutsche Thomson Brandt GmbH, Villingen-Schwennigen, Fed. Rep. of Germany

[21] Appl. No.: 247,548

[22] Filed: Sep. 22, 1988

[30] Foreign Application Priority Data

Sep. 30, 1987 [DE] Fed. Rep. of Germany ....... 3732918

[51] Int. Cl.$^5$ .................. G11B 17/04; G11B 17/06
[52] U.S. Cl. .................. 369/204; 369/202; 369/178
[58] Field of Search .............. 156/73.1, 300; 369/178, 369/202, 203, 204, 205

[56] References Cited

U.S. PATENT DOCUMENTS

| | | | |
|---|---|---|---|
| 2,348,257 | 5/1944 | Kahl et al. | 369/204 |
| 3,280,272 | 10/1966 | Simpson | 369/178 |
| 4,113,263 | 9/1978 | Takizawa | 369/203 |
| 4,513,409 | 4/1985 | Staar | 369/77.1 |
| 4,570,194 | 2/1986 | Schatteman | 360/97 |
| 4,589,101 | 5/1986 | Schatteman | 369/38 |
| 4,677,607 | 6/1987 | Ejiri | 369/77.1 |

FOREIGN PATENT DOCUMENTS 898529 4/1974 France .

Primary Examiner—William M. Shoop, Jr.
Assistant Examiner—John W. Cabeca
Attorney, Agent, or Firm—E. M. Whitacre; D. H. Irlbeck; L. L. Hallacher

[57] ABSTRACT

A record load-unload device has a curved guide device which engages the periphery of a record being inserted into and removed from said load-unload device. A friction drive member engages the edge of the record, and a drive device moves the record along the guide device for inserting and removing a record into and out of the load-unload device.

7 Claims, 2 Drawing Sheets

RECORD LOAD-UNLOAD DEVICE

BACKGROUND

This invention relates generally to load-unload devices for record players and particularly to such a device for a CD record player. Several types of record loading and unloading devices are known in the art. One type of prior art load-unload device utilizes a motor driven drawer, into which the record is manually inserted and removed from. These devices typically are mechanical or electro-mechanical and thus are rather sophisticated, and therefore expensive. Such devices also usually are slow and noisy and therefore are not always desirable.

For these reasons, there is a need for a record load-unload device which is simple in construction, and thus inexpensive to manufacture, and which operates rapidly and with a minimum of noise. The present invention fulfills these needs.

SUMMARY

A record load-unload device has a guide device for engaging the rim of a record being inserted into and removed from the device. The guide device is a curved member having a grooved surface which engages the periphery of a record being inserted into and removed from the load-unload device. A friction drive member engages the edge of the record, and a drive means drives the friction drive member. The friction drive member is positioned diametrically opposite to the entry to the guide device whereby rotation of the drive member moves the record along the guide device for inserting and removing a record into and out of the load-unload device.

DETAILED DESCRIPTION

Figure 1:
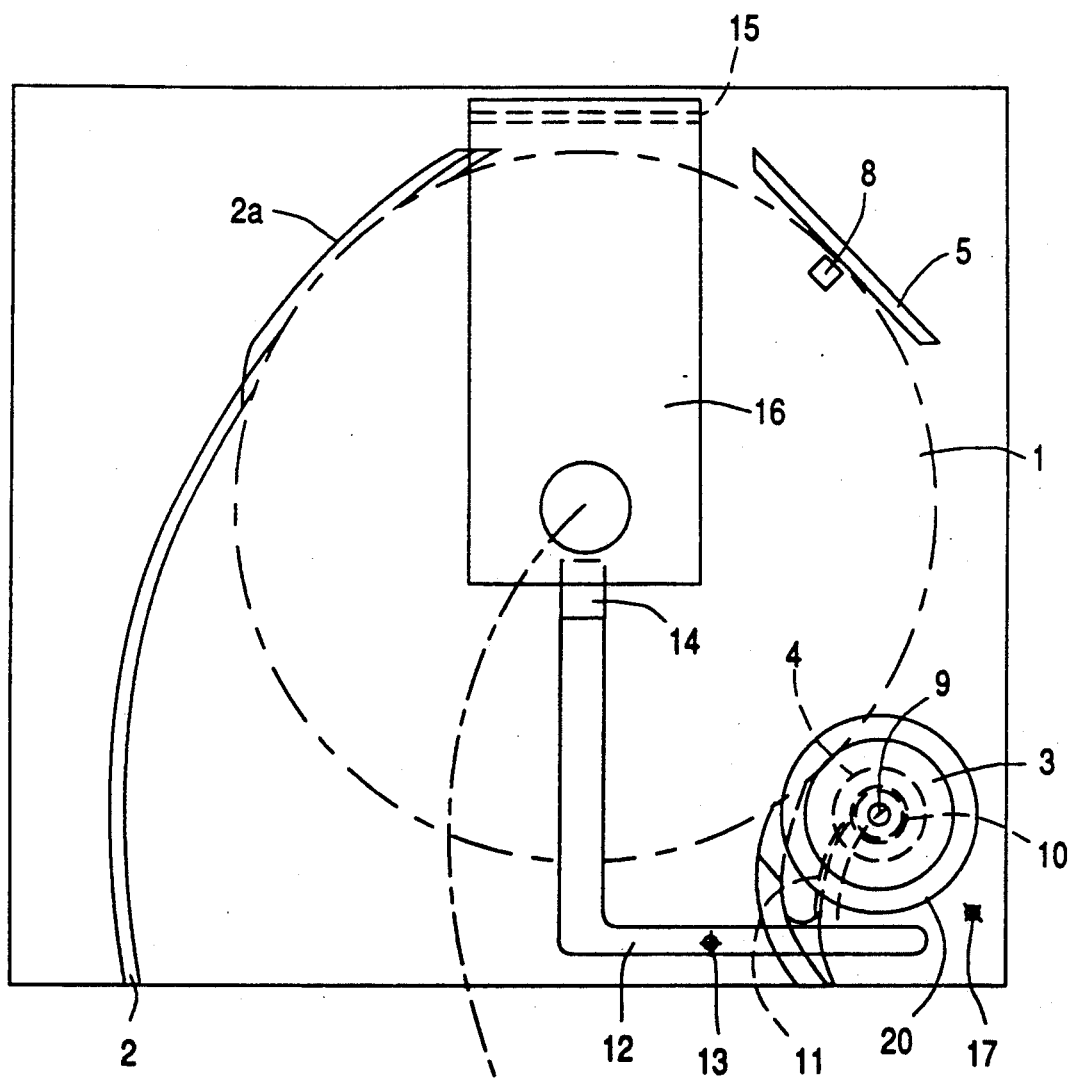
FIG. 1 is a simplified top view of a preferred embodiment.
Figure 2:
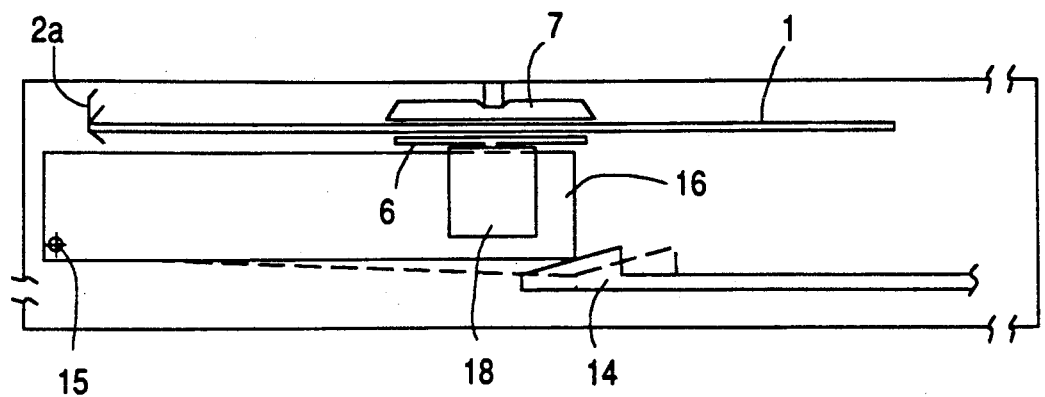
FIG. 2 is a simplified side view of the preferred embodiment, viewed from the left and close to the center of FIG. 1.
Figure 3:
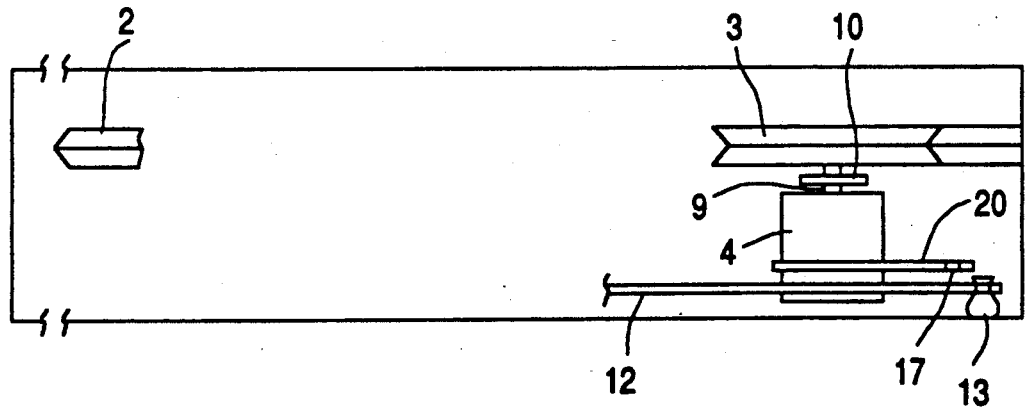
FIG. 3 is a simplified side view of the preferred embodiment, viewed from the left and close to the side of FIG. 1.

In FIGS. 1 and 2, the inventive compact disc (CD) load-unload device includes a curved guide device 2, which preferably is an arc of a circle. The inside of the guide device 2 includes a groove in which the record 1 can move. The edge of the CD record 1 engages the guide device 2 whereby the circular configuration of the CD record enables the record to roll in the guide device groove and position the record in the load-unload device. As a CD record is loaded into the load-unload device, through a slot in the front of the device, one side of the record rests in the groove formed in guide device 2. A friction wheel engages the side of the record diametrically opposed to the entrance to the curved guide 2. The friction wheel 3 is driven by a drive motor 4. When the CD record 1 is inserted into the load-unload device, drive motor 4 is energized, either by detecting the presence of the record or by a manual on/off switch. For example, when a record is inserted into guide device 2, the record also engages friction wheel 3. The forward insertion motion of the record causes friction wheel 3 to rotate the shaft of motor 4 and generate a pulse. This pulse can be used as a start pulse for the motor. The drive motor 4 and the friction wheel 3 rotate in a clockwise direction causing the CD record 1 to rotate in a counterclockwise direction and roll along the guide device 2 into engagement with a stop 5.

A drive mechanism 16 includes a pick-up device for reading the information recorded on the CD record 1, and a turntable 6 for rotating the CD record. The CD record 1 is brought into engagement with the drive mechanism 16 utilizing a lifting lever 12 having a wedge-shaped end 14. The lever 12 is pivotable about an axis 13. The lever 12 is activated when the CD record 1 stops moving along the guide device 2 because of engagement with the mechanical stop 5. A small pinion 10 is mounted on the axis 9 and rotates along with the shaft of the motor 4. A fixed curved rack 11 is positioned to engage the pinion 10. The drive motor 4, friction wheel 3 and pinion 10 are mounted on a holding plate 20 which is mounted to pivot about an axis 17.

As explained above, drive motor 4 and friction wheel 3 rotate clockwise to rotate CD record 1 along guide device 2 into engagement with stop 5. When the CD stops moving, motor 4 continues to rotate and the action of friction wheel 3 against the edge of CD record 1 causes the motor 4, and friction wheel 3 to pivot on plate 20 about axis 17 as the pinion 10 engages the curved rack 11. This motion brings motor 4 into engagement with lever 12 and rotates the lever about axis 13. The drive mechanism 16 is rotatable about an axis 15 and is arranged beneath CD record 1. As motor 4 activates lever 12 the wedge-shaped end 14 biases drive mechanism 16 upwardly bringing turntable 6 into engagement with CD record 1. The guide device 2 includes an offset portion 2a which allows record 1 to be lifted out of the guide device. A rotatable holding mechanism 7 holds CD record 1 on turntable 6 and drive mechanism 16 rotates record 1 for playing as a pickup device (not shown) receives signals from record 1. The rotation of drive motor 4 can be stopped either by a switch which senses the presence of the record on turntable 6, or by sensing the increase of current in the motor which occurs when the motion of lever 12 is stopped. This mechanism is a simple, reliable and low cost means of placing CD record 1 into turntable 6.

If desired, the position of CD record 1 can be sensed by a sensor 8, such as a light source and photodetector. When the CD record 1 is fully inserted into the load-unload device sensor 8 produces an electrical signal which actuates stop 5 to stop the motion of CD record 1. The action of pinion 10 and drive motor 4 in raising the record onto turntable 6 is then the same as described above.

The CD record 1 is removed from the load-unload device simply by reversing the direction of rotation of motor 4. The pinion 10 then moves inwardly along curved rack 11 and lever 12 returns to the rest position and disengages wedge-shaped end 14 from mechanism 16, allowing CD record 1 to move outwardly along guide device 2.

The invention is useful with most record playing apparatus, such as CD players, video players, DRAW disc players and magneto-optical sets.

What is claimed is:

1. In a record load-unload device having a guide device for engaging the rim of a record being inserted into and removed from said load-unload device, an improvement wherein said guide device is a curved member having a grooved surface for engaging the periphery of a record being inserted into and removed from said load-unload device;

a friction drive member for engaging the edge of said record, and drive means for driving said friction drive member, said friction drive member being positioned diametrically opposite to the entry to said guide device whereby rotation of said drive member moves said record along said guide device for inserting and removing a record into and out of said load-unload device.

2. The device of claim 1 wherein the distal end of said guide device includes an offset portion for permitting a record to be raised out of said guide device.

3. The device of claim 1 wherein the axis of rotation of said drive means and of said friction drive member is movable with respect to said record.

4. The device of claim 3 further including a pinion mounted on the shaft of said drive means, and a stationary curved rack engaging said pinion, said drive means being mounted on a plate pivotable about an axis whereby said drive means pivots about said axis when said record is fully inserted into said load-unload device.

5. The device of claim 4 further including a pivotable lifting lever having a wedge-shaped end, said lever being pivoted by said drive means when said drive means pivots about said axis;

a drive mechanism including a turntable arranged in the proximity of said wedge-shaped end, said drive mechanism being pivotably mounted whereby pivoting of said lifting lever engages said wedge-shaped end with said drive mechanism and brings said turntable into engagement with said record.

6. The device of claim 1 wherein the loading of a record into said load-unload device engages said record with said guide device and said friction wheel to slightly turn said motor to generate a start pulse.

7. The device of claim 1 further including a mechanical stop for limiting the insertion of said record into said load-unload device.

* * * * *